Jan. 23, 1962     M. L. DRING     3,018,043
DIGITAL TYPE ANGLE COUNTER

Filed May 13, 1957     5 Sheets-Sheet 1

INVENTOR.
MORGAN L. DRING
BY

ATTORNEY

Jan. 23, 1962   M. L. DRING   3,018,043
DIGITAL TYPE ANGLE COUNTER
Filed May 13, 1957   5 Sheets-Sheet 2

INVENTOR.
MORGAN L. DRING
BY
ATTORNEY

Jan. 23, 1962 M. L. DRING 3,018,043
DIGITAL TYPE ANGLE COUNTER
Filed May 13, 1957 5 Sheets-Sheet 3

INVENTOR.
MORGAN L. DRING
BY
ATTORNEY

Jan. 23, 1962 M. L. DRING 3,018,043
DIGITAL TYPE ANGLE COUNTER

Filed May 13, 1957 5 Sheets-Sheet 4

INVENTOR.
MORGAN L. DRING
BY
ATTORNEY

INVENTOR.
MORGAN L. DRING
ATTORNEY

United States Patent Office 3,018,043
Patented Jan. 23, 1962

3,018,043
DIGITAL TYPE ANGLE COUNTER
Morgan L. Dring, Belleville, N.J., assignor to The Bendix Corporation, a corporation of Delaware
Filed May 13, 1957, Ser. No. 658,714
11 Claims. (Cl. 235—117)

The invention relates to a digital type mechanism for the display of bearing, azimuth, or other angular position information, such as are used in rotary indexing mechanisms, navigational computers and instruments, and trigonometric computing devices.

The difficulty of design of such a device in a digital display form arises from the requirement that the display indexing action must be discontinuous at the value 359, 359.9, 359.99 etc., depending on whether the unit of increment is 1, 0.1 or 0.01 etc. This discontinuity requirement in turn arises because of the conventional angular division of a circle into 360 degrees instead of division into some multiple of 100 to conform with the usual decimal system practice. At all indicated values between and including 001 and 358 (or again 000.1 and 359.8, 000.01 and 359.98 depending on the value of the increment) the displayed indication increases or decreases only by the amount of the increment. However, at 000 (or 000.0 or 000.00), when the display is driven in an increasing direction it must increase by the amount of the unit of increment, but when the display is driven in a decreasing direction the next indication must become 359 (or 359.9 or 359.99). Also at 359 (or 359.9 or 359.99) when the display is driven in a decreasing direction it must decrease by the amount of the unit of increment, but when the display is driven in an increasing direction, the next indication must be 000 (or 000.0 or 000.00). Previously such a display action has been accomplished by mounting thirty-six pairs of numerals to display hundreds and tens values on a large drum (or for space economy reasons on a long continuous tape) which indexes one position with each complete rotation of the units wheel. Also, previous types used three wheels in a manner somewhat similar to that described herein, but required an extreme amount of space for the mechanism.

Regardless of whether a drum, a tape, or wheels are used to carry the tens and hundreds numbers, the space required for such an indicator is considerable, also the necessary configuration is often such as to make it difficult for inclusion in a restricted housing within which other components must also be placed. The type of digital indicator being described reduces the necessary mounting space and permits increased numeral size simultaneously. The internal mechanism has been simplified by the use of basically identical gears in all cases and the jack-shaft rotation to effect each indexing action has been increased to permit greater accuracy of the numeral centering without requiring high precision gears.

An object of the invention therefore is to provide a device of the above type in which the arrangement of the operating mechanism is simplified so as to provide a pair of operating shafts on which are carried six rotatable sub-assemblies in which discontinuity in the number sequence at 359 degrees and 000 is obtained by the use of a partial shell or shield covering a tens-wheel at the position 000 and by the particular relationship of the numbers on this shell and those on a hundreds-wheel.

Another object of this invention is to provide novel means for effectively locking the tens-wheel display at the numeral 5 between counter display conditions of 359 and 059.

Another object of the invention is to provide a particular configuration of the locking plates so inter related as to prevent undesired rotation of the hundreds-wheel assembly and tens-wheel assembly between indexing actions of the mechanism.

These and other objects and features of the invention are pointed out in the following description in terms of the embodiment thereof which is shown in the accompanying drawings. It is to be understood, however, that the drawings are for the purpose of illustration only and are not defined as a definition of the limits of the invention, reference being had to the appended claims for this purpose.

Figure 1:
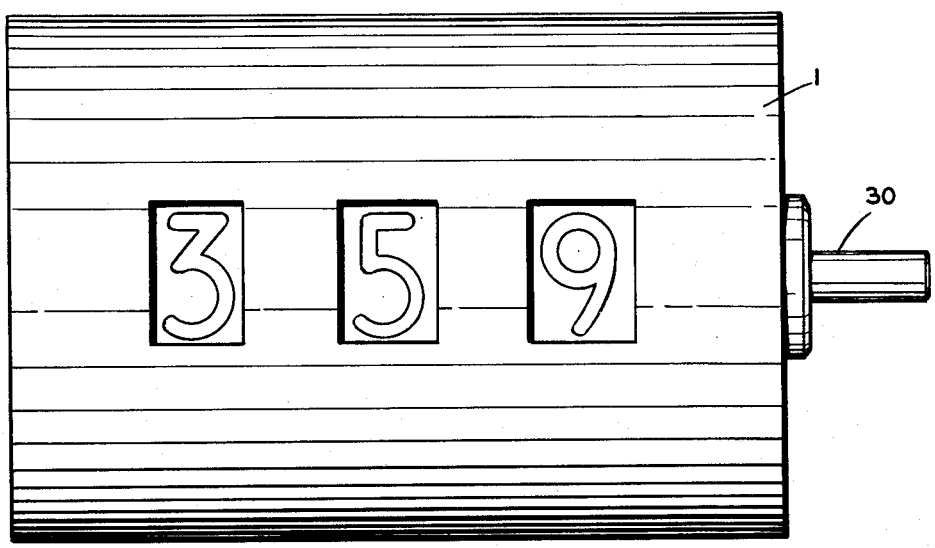
FIG. 1 is a front view of the counter mechanism and casing in assembled relation.
Figure 2:
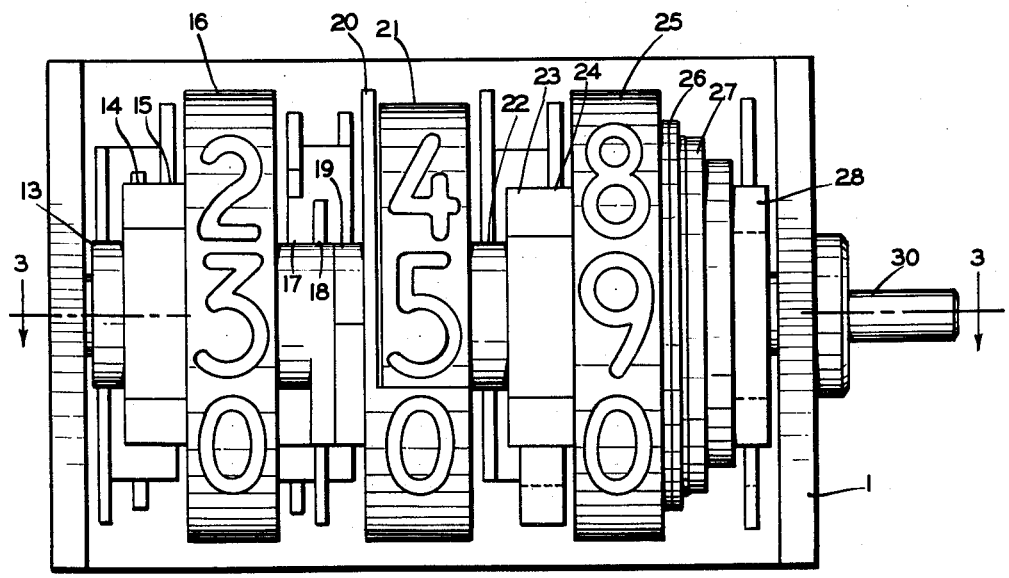
FIG. 2 is a front view of the counter mechanism with the casing of FIG. 1 removed.
Figure 3:
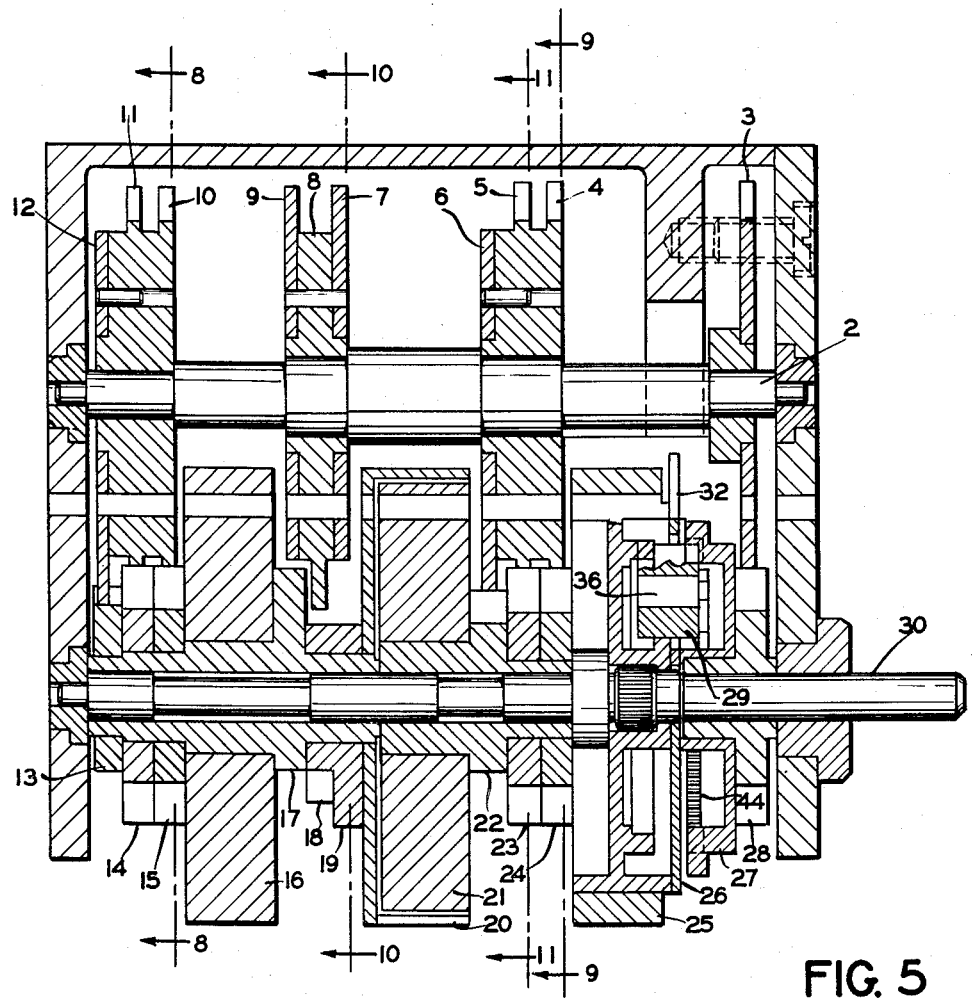
FIG. 3 is a sectional view of FIG. 2 taken along the lines 3—3 and looking in the direction of the arrows.
Figure 8:
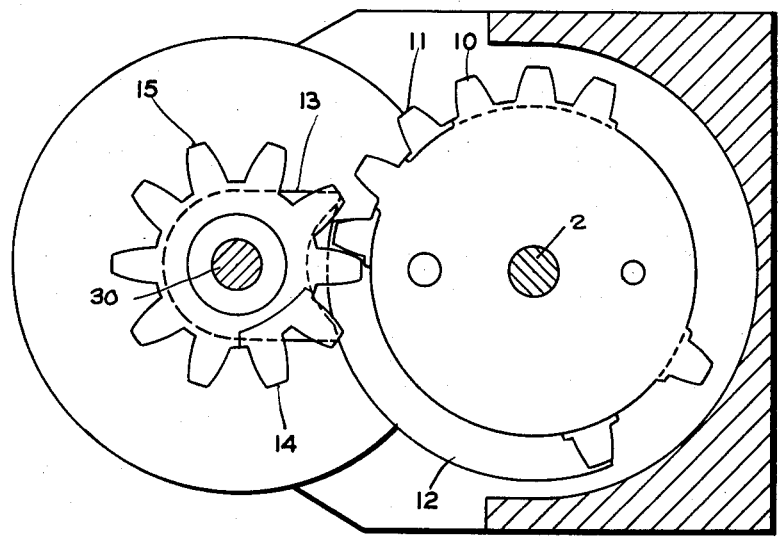
FIG. 8 is a sectional view of FIG. 3 taken along the lines 8—8 and looking in the direction of the arrows.
Figure 9:
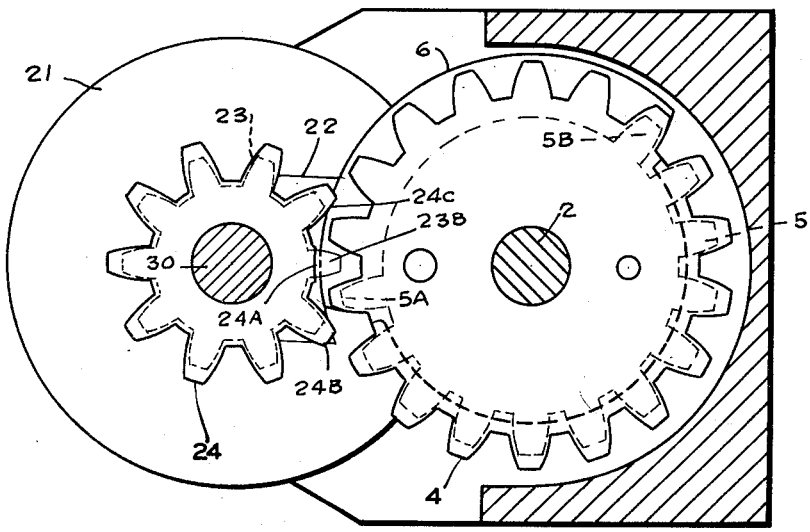
FIG. 9 is a sectional view of FIG. 3 taken along the lines 9—9 and looking in the direction of the arrows.
Figure 10:
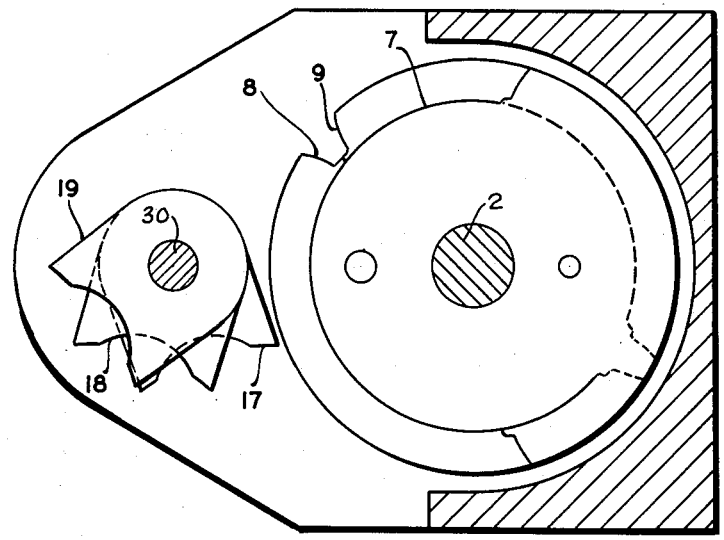
FIG. 10 is a sectional view of FIG. 3 taken along the lines 10—10 and looking in the direction of the arrows.
Figure 11:
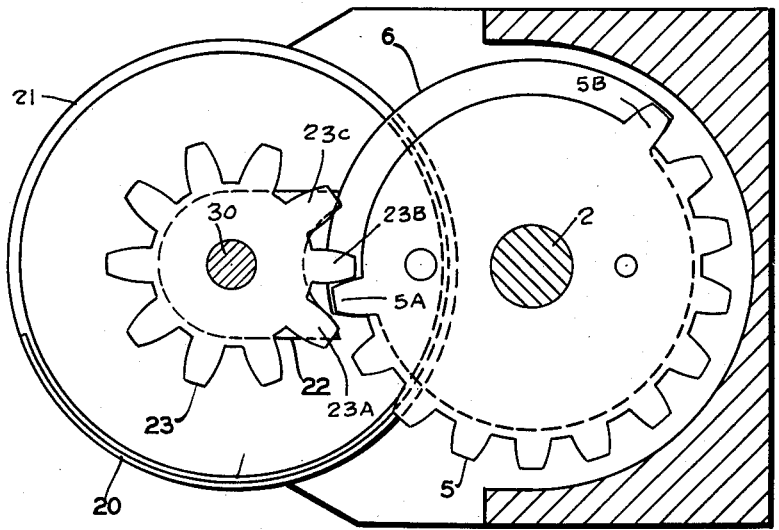
FIG. 11 is a sectional view of FIG. 3 taken along the lines 11—11 and looking in the direction of the arrows.

Referring to the drawings of FIGURES 1 to 3, a housing 1 is provided as a means for enclosing and supporting the counter mechanism. The shaft assembly 2 of FIGURE 3, is a free-rotating jack-shaft to which are rigidly attached gears 3, 4, 5, 10 and 11 and lock plates 6, 7, 8, 9 and 12. An input-shaft 30 has a units wheel 25 rigidly attached to it. An indexing wheel 27 and gear 28, as a complete sub-assembly; a tens-wheel 21, gears 23 and 24 and locking plate 22, as a complete sub-assembly; and a hundreds-wheel 16, gears 14 and 15, lock plates 13, 17, 18 and 19, and shell 20, as a complete sub-assembly all rotate independently and freely on the input-shaft 30, as a bearing shaft. Gears 3 and 28 do not have any teeth removed and are therefore in mesh at all times. Gears 4 and 24, as shown in FIGURE 9; gears 5 and 23, as shown in FIGURE 11; gears 10 and 15 and gears 11 and 14, as shown in FIGURE 8, have teeth removed and are positioned relative to each other in order to provide an indexing action of 36 degrees (1/10 revolutions) of the tens-wheel and hundreds-wheel at proper intervals. The gears 5 and 23 are substantially the same size as the gears 4 and 24 respectively, as shown in FIGURE 3, but are schematically shown in FIGURE 9 to be smaller than gears 4 and 24 to more clearly indicate the relationship between the teeth on these gears. Lock-plates 6 and 22, shown in FIGURES 3 and 11, prevent the tens-wheel 21 from rotating at counter displays of 359 degrees through 059 degrees. Lock plates 7 and 19, shown in FIGURES 3 and 10, prevents the hundreds-wheel 16 from rotating at counter displays of 060 degree through 099 degree. Lock-plates 8 and 18, shown in FIGURES 3 and 10, prevent the hundreds-wheel 16 from rotating at counter displays of 200 degrees through 299 degrees. Lock-plates 12 and 13, shown in FIGURES 3 and 8, prevent the hundreds-wheel 16 from rotating at counter displays of 300 degrees through 359 degrees. The hundreds wheel 16 carries the numerals 1, 1, 2, 3, 0, 0, 0, 0, 0, and 0.

Figure 4:
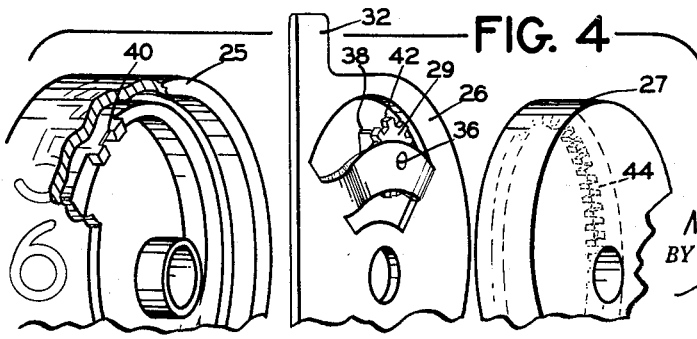
FIG. 4 is an exploded view of the internal gearing for driving the indexing wheel.
Figure 5:
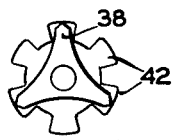
FIG. 5 is a perspective view of the indexing pinion.
Figure 6:
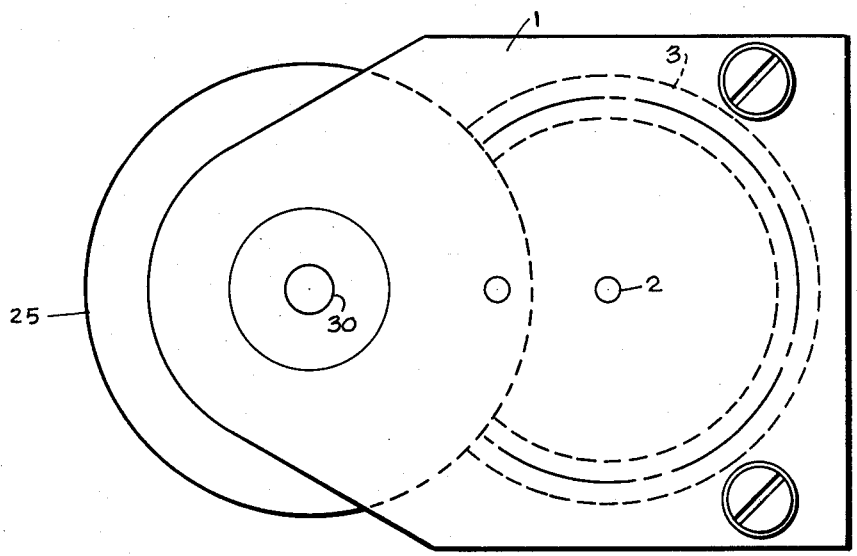
FIG. 6 is an end view of FIG. 2.
Figure 7:
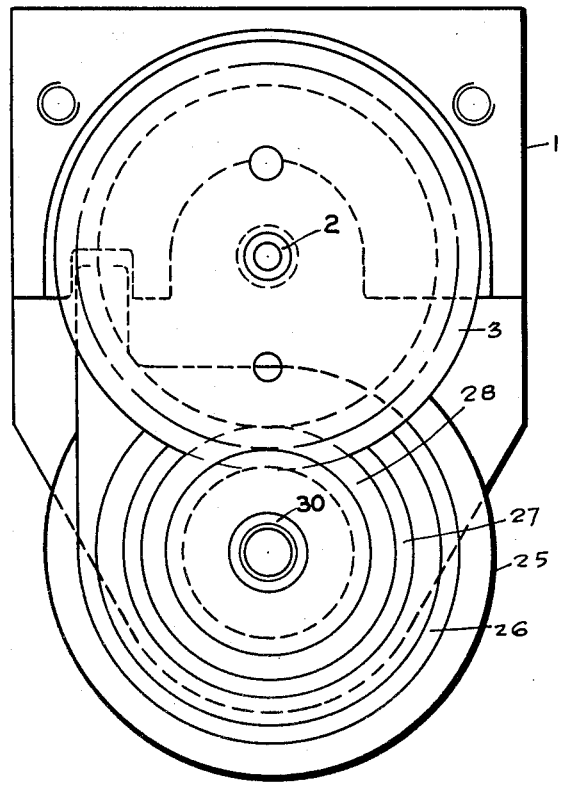
FIG. 7 is an end view of FIG. 3 with the end plate removed.

The shell 20 is only a partial wheel rotating concentric to and in the same plane as the tens-wheel 21 and carries the numerals 0, 1, 2, 3, 4, on the half of its circumference. These numerals are disposed opposite the hundreds-wheel 16 numerals in the following manner:

| Hundreds-Wheel 16 | Shell 20 |
|---|---|
| 1 | |
| 1 | |
| 2 | |
| 3 | |
| 0 | 0 |
| 0 | 1 |
| 0 | 2 |
| 0 | 3 |
| 0 | 4 |
| 0 | |

Where no number appears in the column for the shell 20, the shell face has been cut away so that the tens-wheel 21 is visible. A plate 26, is supported on the input shaft 30, and in an operative position by a tab 32 held in a suitable internal slot provided in the housing 1. The plate 26 is of a conventional structure and, as shown in detail in FIGURES 3, 4 and 5, includes an indexing pinion 29 rotatable on a pin 36 supported by the plate 26. The pinion 29 includes a three toothed gear 38 engageable with the two internal teeth 40 of the units wheel 25 and the pinion 29 also includes the additional six-toothed gear 42 engageable with the teeth of the internal ring gear 44 in the indexing wheel 27.

Thus the shaft 30 drives the units wheel 25 affixed thereto and through the teeth 40, pinion 29 and internal ring gear 44, the indexing wheel 27. The gear 28 affixed to the wheel 27 is in turn drivingly connected through gear 3 to the jack-shaft 2.

Operation

Assuming for simplicity of description an initial displayed value of 100 degrees and operation of the counter mechanism so as to increase the displayed value, the operation of the mechanism is as follows:

(a) Rotation of the input shaft 30, 9/10 of one revolution, causes the units-wheel 25, to display the numerals 0, 1, 2, 3, 4, 5, 6, 7, 8, 9 successively in the right hand viewing position.

(b) Additional rotation of 1/10 revolution causes the numeral 0 to be displayed, the two teeth 40 of the partial internal gear of the units-wheel to engage the three tooth indexing pinion 29, and rotates the pinion 120°. This in turn causes the indexing wheel 27, and gear 28, to rotate 1/10 revolution. The gear pass made up of gears 28 and 3 causes the jack-shaft 2 to rotate 20°. Rotation of the jack-shaft and gears 4 and 5 through this angle causes the tens-wheel to index 1/10 revolution.

(c) This causes the visible display to change from 100 to 110. Rotation of the gears 10 and 11 and lock plates 6, 7, 8, and 9 when the jack-shaft turns has no effect, because these components are not in contact with their mating parts. No rotation of the hundreds-wheel 16 and shell 20 occurs because lock plates 8 and 18 are in the locking position and prevent rotation.

(d) The action just described is repeated for 7 9/10 additional revolutions of the input shaft 30 which drives the display in unit increments to 189.

(e) The next 1/10 revolution of the input shaft 30 drives the tens-wheel as previously described to bring the FIGURE 9 into visible position, unlocks the plates 8 and 18, and meshes the gears 11 and 14 to drive the hundreds wheel sub-assembly 1/10 revolution so that the second numeral 1 on this wheel is visible. The display now shows 190.

(f) The last 1/10 of the next full revolution of the input shaft 30 again drives the tens-wheel as previously described to bring into view the numeral 0, drives the hundreds wheel sub-assembly another 1/10 revolution to bring the next numeral 2 into viewing position.

(g) The display now shows 200, the mesh of gears 11 and 12 has been released, and the lock plates 9 and 17 have been brought into the locked position.

(h) The action described in (a) and (b) is now repeated 9 times driving the display from 200 to 290.

(i) The last 1/10 of the next full revolution of the units wheel indexes the tens-wheel to display 0, unlocks plates 9 and 17, meshes gears 11 and 14 which index the hundreds wheel sub-assembly to display 3, and brings lock plates 12 and 13 into the locked position. The display now shows 300.

(j) The action described in (a) and (b) is now repeated 5 times driving the display from 300 to 350. As the tens wheel is indexed to position 5, the mesh of gears 5 and 23, as shown in FIGURE 11, as well as the mesh of the gears 4 and 24, as shown in FIGURE 9, are released and lock-plates 6 and 22 are brought into the locked position as a last tooth 5A of the gear 5 moves out of meshing relation with a tooth 23A of the gear 23, as shown in FIGURE 11.

(k) The last 1/10 of the next full revolution of the units wheel unlocks plates 12 and 13, and meshes gears 10, 11, 14 and 15 which index the hundreds wheel subassembly to display 0. The shell 20, which is a part of the hundreds wheel sub-assembly, rotates with the hundreds-wheel to bring the numeral 0 into the tens-numeral viewing position and covers the numeral 5 on the ten-wheel. The gears 4 and 5 continue out of meshing relation with the gears 24 and 23 respectively, while both gears 4 and 5 together with the lock-plate 6 are driven by the input shaft 30 through jack-shaft 2 in a counterclockwise direction to a position one tooth displaced from the position of gears 4 and 5, shown by FIGURE 9. Rotation of the tens-wheel is prevented by the action of lock-plates 6 and 22. The display now shows 000.

(l) The next four revolutions of the units wheel causes the hundreds-wheel sub-assembly (which includes the shell) to index four times and display successively 010, 020, 030, and 040. The tens wheel remains locked by the action of plates 6 and 22 at a position such that the numeral 5 would be displayed if the shell were not covering it and the gears 4 and 5 together with lock-plate 6 are further actuated by the rotation of the jack-shaft 2 in a counterclockwise direction to a position displaced five teeth from the position shown by FIGURE 9.

(m) The next revolution of the units wheel causes the hundreds-wheel sub-assembly to index one position displaying the numeral 0 in the hundreds position and bringing the cut-away portion of the shell in the viewing position so that the numeral 5 on the tens-wheel is visible. Lock plates 7 and 19 are brought into the locking position and the mesh of gears 10, 11, 14, and 15 is released. The tens wheel remains locked at the 5 position by the action of plates 6 and 22 so that the display now shows 050, while the gears 4 and 5 together with lock-plate 6 are actuated by the further rotation of the jack-shaft 2 in a counterclockwise direction to a position displaced six teeth from the position shown in FIGURE 9.

(n) The action described in (a) and (b) is now repeated 4 times. The gears 5 and 23, are brought into mesh and the lock plates 6 and 22 are released with the first repeat of (a) and (b) in which action the gear 5 together with lock-plate 6 is actuated by rotation of the jack-shaft 2 in a further counterclockwise direction so that the first tooth 5B shown in FIGURE 11 in front of the lock-plate 6 meshes with a tooth 23B of gear 23 to drive the lock-plate 22 in a clockwise direction so as to release plate 6 and drive the sub-assembly including gear 24 in a clockwise direction so as to cause a tooth 24B of gear 24 to mesh with the gear 4 and the tens wheel 21 to be driven to a position to display numeral 6. The tens wheel is thereafter driven on successive repeats of the action described in (a) and (b) to the position 9. The display now shows 090.

(o) The next full revolution of the units-wheel indexes the tens-wheel 1/10 revolution, unlocks plates 7 and 19, meshes gears 10 and 15 to index the hundreds wheel sub-assembly 1/10 revolutions, and brings lock-plates 8 and 18 into the locked position. The display now has completed one full cycle and shows 100 which was the starting point.

(p) The cycle is infinitely repeatable and is reversable.

In the rotation of the gears 4 and 5 to effect the subsequent adjustment of the display numerals between 60 to 349, as set forth in steps (a) through (j), the arrangement of the teeth of the gears 4 and 5 in relation to the lock-plates 6 and 22 is such that the lock-plates 6 and 22 may rotate freely relative one to the other, while the lock-plates 6 and 22 are in effective operation to lock rotation of the tens wheel 21 in the range of adjustment of the display numerals between 350 to 59.

Thus in the adjustment of the display numeral 349 to 350 as set forth in step (j), the tens wheel 21 is so indexed as to display the numeral 5 as the last tooth 5A of the gear 5 moves in a counterclockwise direction into cooperative relation with the tooth 23A of the gear 23 to drive the gear 23 and thereby the sub-assembly gear 24 so as to move the open tooth 24A of the gear 24 to the position shown in FIGURE 9.

In the last mentioned adjusted position of the open tooth 24A, the gear 24 is placed out of meshing relation with the gear 4, and the lock plates 6 and 22 are simultaneously positioned in operative relation so as to prevent rotation of gears 23 and 24 and the tens wheel 21, while the gear 5 due to the space provided between the last tooth 5A and the first tooth 5B remains out of mesh with the gear 23 upon a further counterclockwise rotation of the gear 5 until the first tooth 5B once again meshes with tooth 23B of the gear 23 to drive lock-plate 22 in a clockwise direction so as to release the plate 6 to effect the steps set forth under (n) through (o). The locking action of the lock-plates 6 and 22 may be reversed upon a clockwise rotation of the gear 5 causing the first tooth 5B to cooperate with a tooth 23C of the gear 23 to drive the gear 23 in a counterclockwise direction and thereby the sub-assembly gear 24 so as to move the open tooth 24A of the gear to the position shown in FIGURE 9 out of meshing relation with the gear 4 and the lock-plate 22 in locking relation with plate 6 as the display numerals are adjusted from 60 to 59. Similarly upon further clockwise rotation of the gear 5 causing the last tooth 5A to cooperate with the tooth 23B of the gear 23 so as to drive the gear 23 in a counterclockwise direction, the lock-plate 22 may be driven in a like counterclockwise direction so as to release plate 6 while a tooth 24B of the gear 24 is driven in a counterclockwise direction into meshing relation with the gear 4 as the display numerals are adjusted from 350 to 349.

From the foregoing, it will be seen that the counter mechanism herein described includes the following features:

(1) Only three rotating sub-assemblies are required to carry the numerals which are displayed.

(2) Only six rotating sub-assemblies are required for the entire mechanism.

(3) A successive indexing action of the hundreds-wheel and shell is obtained by a particular configuration of teeth of gears in mesh on the jack-shaft and on the hundreds-wheel assembly.

(4) The discontinuity in the number sequency at 359 and 000 is obtained by the use of a partial shell covering the tens-wheel at the position 000 and by the particular relationship of the numbers on this shell and on the hundreds wheel.

(5) The integration of the partial shell and hundreds-wheel into one rotating sub-assembly to simplify gear requirements.

(6) A continuous and uniform indexing of the tens-wheel except between display conditions of 359 and 059.

(7) Locking of the tens-wheel display at the numeral 5 between counter display conditions of 359 and 059.

(8) The particular configuration of teeth of the gears in mesh on the jack-shaft and on the tens-wheel assembly.

(9) The particular configuration of the locking plates and their inter-relation to prevent undesired rotation of the hundreds-wheel assembly and tens-wheel assembly between indexing actions of the mechanism.

(10) The configuration and inter-relation of all components to enable a jack-shaft rotation of 20° for each indexing action.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A counter mechanism comprising a shaft the unit movements of which are to be counted, a series of index members carrying designations indicating respectively units, tens and hundreds, means connecting said shaft to the units index member to advance said unit member one step for each unit movement of said shaft, a second shaft, means drivingly connecting the first mentioned shaft to the second shaft, second means drivingly connecting the second shaft to the tens index member, third means drivingly connecting the second shaft to the hundreds index member, a shield having an index area covering a portion of the index area of the tens index member and normally positioned out of registration therewith, means adjustably positioned by said second shaft to selectively render the second and third connecting means ineffective, said tens and hundreds index members being selectively driven through said second and third connecting means by said second shaft in a predetermined relation to said units index member, and means operatively connecting the shield integral with the hundreds index member so that said shield is adjustably positioned through said hundreds index member in a predetermined relation with said tens index member.

2. The combination defined by claim 1 including braking means releasably applied by said second shaft to lock the tens and hundreds indexing members from rotation during predetermined indexing actions of the counter mechanism.

3. The combination defined by claim 1 including a first locking means adjustably positioned to brake the tens indexing member from rotation, a second locking means adjustably positioned to brake the hundreds indexing member from rotation, and means driven by said second shaft to operatively control the first and second locking means during predetermined indexing actions of the counter mechanism.

4. A counter mechanism comprising a series of index members carrying designations indicating respectively units, tens and hundreds, a drive shaft to rotate the units index member, a jack-shaft including means to selectively drive the tens and hundreds index members in a predetermined relation to said units index member, means drivingly connecting the drive shaft to the jack-shaft, a shield having a segmental portion adjustably positioned in and out of shielding relation with the tens index member, said segmental portion of the shield having an index area effective upon adjustment of the segmental portion into shielding relation with the tens index member, and said shield operatively connected to the hundreds index member in such a manner as to be adjustably positioned thereby in a predetermined relation with said tens index member.

5. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the tens and hundreds index members, and means controlled by said second shaft to selectively effect operation of the braking means to lock said tens and hundreds index members from rotation in predetermined relation to the rotation of said units index member by the first shaft.

6. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the tens index member, and means controlled by said second shaft to selectively effect operation of the braking means to lock said tens index member from rotation in predetermined relation to the rotation of said units index member by the first shaft.

7. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the hundreds index member, and means controlled by said second shaft to selectively effect operation of the braking means to lock said hundreds index member from rotation in predetermined relation to the rotation of said units index member by the first shaft.

8. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the shield member, and means controlled by second shaft to selectively effect operation of the braking means to lock said shield member from rotation in predetermined relation to the rotation of said units index member by the first shaft.

9. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the shield and tens index members, and means controlled by said second shaft to selectively effect operation of the braking means to lock said shield and tens index members from rotation in predetermined relation to the rotation of said units index member by the first shaft.

10. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the shield and hundreds index members, and means controlled by said second shaft to selectively effect operation of the braking means to lock said shield and hundreds index members from rotation in predetermined relation to the rotation of said units index member by the first shaft.

11. In a counter mechanism of a type including a series of index members carrying designations indicating respectively units, tens and hundreds, a first drive shaft including means to rotate the units index member, a second shaft, means drivingly connecting the first shaft to the second shaft, other means driven by the second shaft to selectively rotate the tens and hundreds index members in a predetermined relation to said units index member, a shield having a segmental portion rotatable in and out of shielding relation with the tens index member, said segmental portion of the shield having an index area effective upon adjustment of the segmental portion into shielding relation with the tens index member, and means operatively connected to said other means to adjustably rotate the shield in a predetermined relation with said tens index member; the improvement comprising braking means for the shield, tens and hundreds index members, and means controlled by said second shaft to selectively effect operation of the braking means to lock said shield, tens and hundreds index members from rotation in predetermined relation to the rotation of said units index member by the first shaft.

References Cited in the file of this patent

UNITED STATES PATENTS 2,463,594     Brigham _____ Mar. 8, 1949

FOREIGN PATENTS 813,492     Germany _____ Sept. 13, 1951